United States Patent
Yang et al.

(10) Patent No.: US 10,637,230 B2
(45) Date of Patent: Apr. 28, 2020

(54) OVER CURRENT PROTECTION CIRCUIT

(71) Applicant: Shenzhen China Star Optoelectronics Semiconductor Display Technology Co., Ltd., Shenzhen (CN)

(72) Inventors: Yong Yang, Shenzhen (CN); Fangyun Liu, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 336 days.

(21) Appl. No.: 15/743,658

(22) PCT Filed: Dec. 6, 2017

(86) PCT No.: PCT/CN2017/114866
§ 371 (c)(1),
(2) Date: Jan. 10, 2018

(87) PCT Pub. No.: WO2019/015224
PCT Pub. Date: Jan. 24, 2019

(65) Prior Publication Data
US 2019/0027918 A1    Jan. 24, 2019

(30) Foreign Application Priority Data

Jul. 18, 2017   (CN) .......................... 2017 1 0586832

(51) Int. Cl.
*H02H 3/08* (2006.01)
*H02M 1/32* (2007.01)
(Continued)

(52) U.S. Cl.
CPC ................ *H02H 3/08* (2013.01); *H02H 7/12* (2013.01); *H02M 1/32* (2013.01); *H02M 1/4225* (2013.01);
(Continued)

(58) Field of Classification Search
CPC ....................... H02H 3/08; H02H 7/12; H05B 41/2851–2853; H02M 1/32
See application file for complete search history.

(56) References Cited

U.S. PATENT DOCUMENTS 5,499,154 A    3/1996  Cullison
7,106,603 B1 *  9/2006  Lin ................... H02M 3/33507
                                                              363/21.08
(Continued)

FOREIGN PATENT DOCUMENTS

CN    202084911 U    12/2011
CN    202145694 U     2/2012
(Continued)

*Primary Examiner* — Thienvu V Tran
*Assistant Examiner* — Christopher J Clark
(74) *Attorney, Agent, or Firm* — Leong C. Lei

(57) ABSTRACT

An over current protection circuit, comprising: a current transformer, having a primary winding connected in series with a primary winding of a power supply transformer and a secondary winding, of which one end is grounded and the other end is coupled to a diode anode; a first resistor, having one end coupled to a diode cathode and the other end grounded; a second resistor, having one end coupled to the diode cathode and the other end coupled to a zener diode cathode; a triode, having a base coupled to a zener diode anode, an emitter grounded and a collector coupled to a light emitter cathode; wherein a light emitter anode is coupled to a LLC chip and a first voltage output end in the power supply; an output end of a light receiver is ground, an input end is coupled to a second voltage output end and a PFC chip.

16 Claims, 1 Drawing Sheet

(51) Int. Cl.
    *H02H 7/12*    (2006.01)
    *H02M 3/335*   (2006.01)
    *H02M 1/42*    (2007.01)
    *H02M 1/00*    (2006.01)

(52) U.S. Cl.
    CPC ............... *H02M 3/33553* (2013.01); *H02M 2001/0009* (2013.01)

(56) References Cited

U.S. PATENT DOCUMENTS

| | | | | |
|---|---|---|---|---|
| 2011/0205770 | A1* | 8/2011 | Isogai ................... | H02M 1/32 363/78 |
| 2012/0249005 | A1* | 10/2012 | Jin ..................... | H05B 45/58 315/206 |
| 2014/0091720 | A1* | 4/2014 | Brinlee ............... | H02M 1/4225 315/186 |
| 2014/0167634 | A1* | 6/2014 | Ivankovic .............. | H05B 45/37 315/210 |
| 2015/0098254 | A1* | 4/2015 | Brinlee ............... | H02M 3/3376 363/21.02 |
| 2016/0329820 | A1* | 11/2016 | Mohtashemi ..... | H02M 3/33523 |
| 2017/0222565 | A1* | 8/2017 | Sonobe ............ | H02M 3/33546 |
| 2018/0034373 | A1* | 2/2018 | Matsuda ................ | H02M 3/28 |
| 2019/0222128 | A1* | 7/2019 | Hirano ............... | G03G 15/5004 |

FOREIGN PATENT DOCUMENTS

| | | |
|---|---|---|
| CN | 202888788 U | 4/2013 |
| CN | 103928909 A | 7/2014 |
| CN | 205231714 U | 5/2016 |
| CN | 206211874 U | 5/2017 |
| CN | 107332213 A | 11/2017 |

* cited by examiner

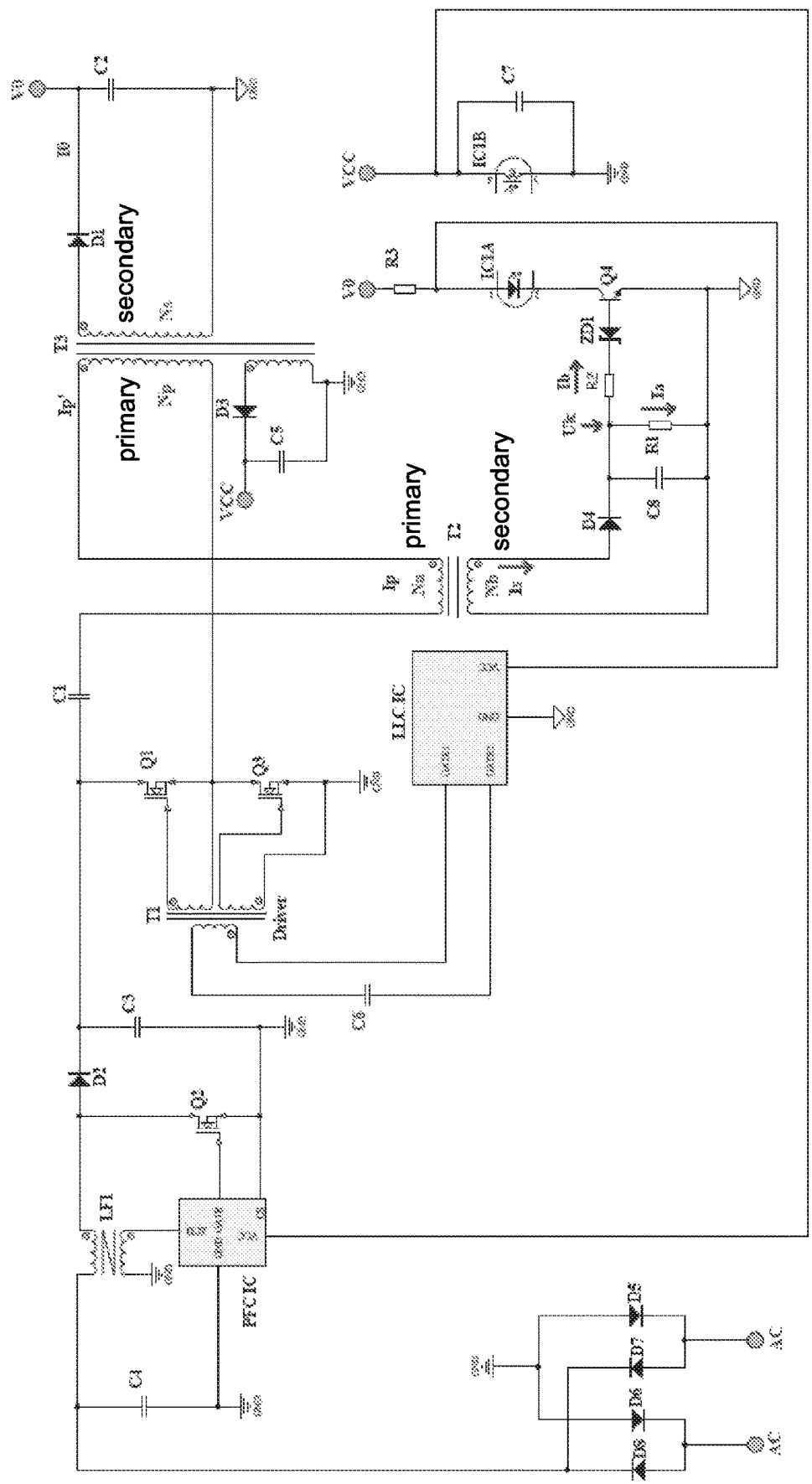

OVER CURRENT PROTECTION CIRCUIT

FIELD OF THE INVENTION

The present invention relates to a power supply field, and more particularly to an over current protection circuit.

BACKGROUND OF THE INVENTION

As concerning the power supply device for all electronic products, except the performance has to meet the requirements of the power supply products, the protection measures of the power supply, such as over voltage protection, over current protection, over temperature protection. Once the electronic product fails, such as the short circuit at the input side or the open circuit at the output side in the electronic product occurs, the output voltage of the power supply must be turned off to protect the power device and the output side device from being burned. Otherwise, it may cause further damage to the electronic product or even cause the operator's electric shock and the fire phenomena, therefore, the over current protection function of the switching power supply must be perfect.

In the existing power circuit design, the resistor is generally used for the over current protection. However, when the over current protection circuit design of a high power supply or an ultra high power supply adopts an over current protection by a resistor, it may cause the resistor to burn out due to the over power and to cause a fire, which is urgent to be improved.

SUMMARY OF THE INVENTION

An objective of the present invention is to provide an over current protection circuit capable of achieving the over current protection for the large current output of the power supply.

For realizing the aforesaid objectives, the present invention provides an over current protection circuit, comprising:

a current transformer, having a primary winding connected in series with a primary winding of a transformer outputting a voltage externally in a power supply and a secondary winding, of which one end is grounded and the other end is coupled to an anode of a diode;

a first resistor, having one end coupled to a cathode of the diode and the other end grounded;

a second resistor, having one end coupled to the cathode of the diode and the other end coupled to a cathode of a zener diode;

a NPN type triode, having a base coupled to an anode of the zener diode, an emitter grounded and a collector coupled to a cathode of a light emitter of an optocoupler;

wherein an anode of the light emitter of the optocoupler is coupled to a power supply pin of a line level control chip in the power supply and is also coupled to a first voltage output end in the power supply through a third resistor;

wherein an output end of a light receiver of the optocoupler is ground, an input end of the light receiver is coupled to a second voltage output end in the power supply and the input end is also coupled a power supply pin of a power factor correction chip in the power supply.

The light emitter of the optocoupler is a light emitting diode.

The light receiver of the optocoupler is a phototransistor, an emitter of the phototransistor is an output end of the light receiver and a collector of the phototransistor is an input end of the light receiver.

The over current protection circuit further comprises a first capacitor, of which one end is grounded and the other end is coupled to the cathode of the diode.

The over current protection circuit further comprises a second capacitor, of which one end is grounded and the other end is coupled to the second voltage output end.

A winding ratio of the primary winding of the transformer and the secondary winding of the transformer is 3:1.

A winding ratio of the primary winding of the current transformer and the secondary winding of the current transformer is 1:40.

A stable voltage of the zener diode is 3.9 volts.

A resistance of the first resistor is 368 ohms.

One end of the secondary winding of the transformer is grounded and the other end of the secondary winding of the transformer is coupled to the first voltage output end.

The present invention further provides an over current protection circuit, comprising:

a current transformer, having a primary winding connected in series with a primary winding of a transformer outputting a voltage externally in a power supply and a secondary winding, of which one end is grounded and the other end is coupled to an anode of a diode;

a first resistor, having one end coupled to a cathode of the diode and the other end grounded;

a second resistor, having one end coupled to the cathode of the diode and the other end coupled to a cathode of a zener diode;

a triode, having a base coupled to an anode of the zener diode, an emitter grounded and a collector coupled to a cathode of a light emitter of an optocoupler;

wherein an anode of the light emitter of the optocoupler is coupled to a power supply pin of a line level control chip in the power supply and is also coupled to a first voltage output end in the power supply through a third resistor;

wherein an output end of a light receiver of the optocoupler is ground, an input end of the light receiver is coupled to a second voltage output end in the power supply and the input end is also coupled a power supply pin of a power factor correction chip in the power supply;

wherein the light emitter of the optocoupler is a light emitting diode;

wherein the light receiver of the optocoupler is a phototransistor, an emitter of the phototransistor is an output end of the light receiver and a collector of the phototransistor is an input end of the light receiver;

wherein the over current protection circuit further comprises a first capacitor, of which one end is grounded and the other end is coupled to the cathode of the diode;

wherein the over current protection circuit further comprises a second capacitor, of which one end is grounded and the other end is coupled to the second voltage output end.

In conclusion, the present invention achieves the over current protection for the large current output of the power supply to promote the efficiency of the power and to reduce the risk of failure and fire of the power due to the resistance current limitation.

BRIEF DESCRIPTION OF THE DRAWINGS

The technical solution and the beneficial effects of the present invention are best understood from the following detailed description with reference to the accompanying figures and embodiments.

In drawings,

FIG. 1 is a circuit diagram of one preferred embodiment of an over current protection circuit according to the present invention.

DETAILED DESCRIPTION OF PREFERRED EMBODIMENTS

Please refer to FIG. 1, which is a circuit diagram of one preferred embodiment of an over current protection circuit according to the present invention. The present invention provides an over current protection circuit comprising a current transformer to combine the over current protection function in kinds of power supplies. The specifications of the respective components and the key current, the key voltages in the embodiment shown in FIG. 1 can be referred to labels in FIG. 1. The entire power supply in FIG. 1 further comprises a power factor correction chip (PFC IC) and a line level control chip (LLC IC). A PFC circuit surrounds the PFC chip. A LLC circuit surrounds the LLC chip. The external alternating current power is inputted and processed by a transformer T1, a transformer T3, the PFC chip and the LLC chip, and then outputs a voltage externally through a first voltage output end V0 coupled to a secondary winding of the transformer T3. The secondary winding of the transformer T3 is also coupled to a voltage output end VCC through a coil to output an internal voltage.

The over current protection circuit of the present invention mainly comprises: a current transformer T2, having a primary winding connected in series with a primary winding of a transformer T3 and a secondary winding, of which one end is grounded and the other end is coupled to an anode of a diode D4; a first resistor R1, having one end coupled to a cathode of the diode D4 and the other end grounded; a second resistor R2, having one end coupled to the cathode of the diode D4 and the other end coupled to a cathode of a zener diode ZD1; a NPN type triode Q4, having a base coupled to an anode of the zener diode ZD1, an emitter grounded and a collector coupled to a cathode of a light emitter IC1A of an optocoupler; wherein an anode of the light emitter IC1A is coupled to a power supply pin of a line level control chip in the power supply and the anode of the light emitter IC1A is also coupled to a first voltage output end V0 in the power supply through a third resistor R3; wherein an output end of a light receiver IC1B of the optocoupler is grounded, an input end of the light receiver is coupled to a second voltage output end VCC in the power supply and the input end is also coupled to a power supply pin of a power factor correction chip in the power supply.

In this preferred embodiment, the light emitter IC1A of the optocoupler is a light emitting diode; the light receiver IC1B of the optocoupler is a phototransistor, an emitter of the phototransistor is an output end of the light receiver IC1B and a collector of the phototransistor is an input end of the light receiver IC1B. The over current protection circuit further comprises a first capacitor C8 for filtering, of which one end is grounded and the other end is coupled to the cathode of the diode D4; the over current protection circuit further comprises a second capacitor C7 for filtering, of which one end is grounded and the other end is coupled to the second voltage output end VCC. One end of the secondary winding of the transformer T3 is grounded and the other end is coupled to the first voltage output end V0 through a diode D1 to output a voltage and a current I0, externally.

In case that a winding ratio of the primary winding of the transformer T3 and the secondary winding of the transformer T3 is N1=Np/Ns, a winding ratio of the primary winding of the current transformer T2 and the secondary winding of the current transformer T2 is N2=Na/Nb and an output current is I0.

The relationship of the output current is I0 and the current of the current transformer is: when the output current I0 of the power increases, the primary current Ip'=(1/N1)*I0 of the transformer T3 also increases. Since the primary winding of the transformer T3 is connected in series with the primary winding of the current transformer, Ip'=Ip and the primary current Ip of the current transformer also increases. Because the relationship of the current ratio and the winding ratio of the current transformer Is=N2*Ip, Is will also increase. According to the above analysis, if the output current I0 increases, then secondary current Is of the current transformer will also increase.

The present invention mainly utilizes the working principle that the primary large current of the current transformer is converted into the secondary small current for the over current protection. When the output current I0 in the circuit exceeds the set over current value, the LLC chip and the PFC chip power down and the power supply stop working.

The following specific embodiment explains the working principle of the over current protection circuit of the present invention:

As shown in FIG. 1, assuming that a winding ratio N1 of the primary winding of the transformer T3 and the secondary winding of the transformer T3 is 3:1, a winding ratio of the primary winding of the current transformer T2 and the secondary winding of the current transformer T2 is 1:40, a stable voltage of the zener diode is 3.9 volts and a resistance of the first resistor is 368 ohms. As shown in the figure, when the current Is=12.5 mA and all flows through the first resistor R1, then the voltage Uk=4.6V and the zener diode ZD1 is in a critical conduction state. Assuming that the current of the over current protection point Iocp=15 A.

In normal work, the current I0<15 A, then the current Ip'=Ip=(1/N1)*I0<5 A, the current Is=N2*Ip<12.5 mA, the zener diode ZD1 is deactivated, the NPN type triode Q4 is deactivated and the light emitter IC1A and the light receiver IC1B are deactivated. Then, the first voltage output end V0 provides power to the LLC IC. The second voltage output end VCC provides power to the PFC IC. The power normally functions.

In abnormal work, the current I0>15 A, then the current Ip'=Ip=(1/N1)*I0>5 A, the current Is=N2*Ip>12.5 mA, the zener diode ZD1 is activated, the NPN type triode Q4 is activated and the light emitter IC1A is activated, the power voltage of the LLC chip is pulled down and powered down and the LLC circuit stops working. The light receiver IC1B is also activated. The PFC chip powers down and the PFC circuit stops working, either. The power is turned off due to the over current protection.

In conclusion, the present invention achieves the over current protection for the large current output of the power supply. The primary large current is converted into the secondary small current with the function of the current transformer for the over current protection to promote the efficiency of the power and to reduce the risk of failure and fire of the power due to the resistance current limitation.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An over current protection circuit, comprising:
   a current transformer, having a primary winding connected in series with a primary winding of a transformer outputting a voltage externally in a power supply and a secondary winding, of which one end is grounded and the other end is coupled to an anode of a diode;
   a first resistor, having one end coupled to a cathode of the diode and the other end grounded;
   a second resistor, having one end coupled to the cathode of the diode and the other end coupled to a cathode of a zener diode;
   a triode, having a base coupled to an anode of the zener diode, an emitter grounded and a collector coupled to a cathode of a light emitter of an optocoupler;
   wherein an anode of the light emitter of the optocoupler is coupled to a power supply pin of a line level control chip in the power supply and is also coupled to a first voltage output end in the power supply through a third resistor;
   wherein an output end of a light receiver of the optocoupler is ground, an input end of the light receiver is coupled to a second voltage output end in the power supply and the input end is also coupled a power supply pin of a power factor correction chip in the power supply.

2. The over current protection circuit according to claim 1, wherein the light emitter of the optocoupler is a light emitting diode.

3. The over current protection circuit according to claim 1, wherein the light receiver of the optocoupler is a phototransistor, an emitter of the phototransistor is the output end of the light receiver and a collector of the phototransistor is the input end of the light receiver.

4. The over current protection circuit according to claim 1, further comprising a first capacitor, of which one end is grounded and the other end is coupled to the cathode of the diode.

5. The over current protection circuit according to claim 1, further comprising a second capacitor, of which one end is grounded and the other end is coupled to the second voltage output end.

6. The over current protection circuit according to claim 1, wherein a winding ratio of the primary winding of the transformer and the secondary winding of the transformer is 3:1.

7. The over current protection circuit according to claim 1, wherein a winding ratio of the primary winding of the current transformer and the secondary winding of the current transformer is 1:40.

8. The over current protection circuit according to claim 1, wherein a stable voltage of the zener diode is 3.9 volts.

9. The over current protection circuit according to claim 1, wherein a resistance of the first resistor is 368 ohms.

10. The over current protection circuit according to claim 1, wherein one end of the secondary winding of the transformer is grounded and the other end of the secondary winding of the transformer is coupled to the first voltage output end.

11. An over current protection circuit, comprising:
    a current transformer, having a primary winding connected in series with a primary winding of a transformer outputting a voltage externally in a power supply and a secondary winding, of which one end is grounded and the other end is coupled to an anode of a diode;
    a first resistor, having one end coupled to a cathode of the diode and the other end grounded;
    a second resistor, having one end coupled to the cathode of the diode and the other end coupled to a cathode of a zener diode;
    a triode, having a base coupled to an anode of the zener diode, an emitter grounded and a collector coupled to a cathode of a light emitter of an optocoupler;
    wherein an anode of the light emitter of the optocoupler is coupled to a power supply pin of a line level control chip in the power supply and is also coupled to a first voltage output end in the power supply through a third resistor;
    wherein an output end of a light receiver of the optocoupler is ground, an input end of the light receiver is coupled to a second voltage output end in the power supply and the input end is also coupled a power supply pin of a power factor correction chip in the power supply;
    wherein the light emitter of the optocoupler is a light emitting diode;
    wherein the light receiver of the optocoupler is a phototransistor, an emitter of the phototransistor is the output end of the light receiver and a collector of the phototransistor is the input end of the light receiver;
    wherein the over current protection circuit further comprises a first capacitor, of which one end is grounded and the other end is coupled to the cathode of the diode;
    wherein the over current protection circuit further comprises a second capacitor, of which one end is grounded and the other end is coupled to the second voltage output end.

12. The over current protection circuit according to claim 11, wherein a winding ratio of the primary winding of the transformer and the secondary winding of the transformer is 3:1.

13. The over current protection circuit according to claim 11, wherein a winding ratio of the primary winding of the current transformer and the secondary winding of the current transformer is 1:40.

14. The over current protection circuit according to claim 11, wherein a stable voltage of the zener diode is 3.9 volts.

15. The over current protection circuit according to claim 11, wherein a resistance of the first resistor is 368 ohms.

16. The over current protection circuit according to claim 11, wherein one end of the secondary winding of the transformer is grounded and the other end of the secondary winding of the transformer is coupled to the first voltage output end.

* * * * *